US006981157B2

(12) United States Patent
Jakobsson et al.

(10) Patent No.: US 6,981,157 B2
(45) Date of Patent: Dec. 27, 2005

(54) METHOD AND APPARATUS FOR ENSURING SECURITY OF USERS OF SHORT RANGE WIRELESS ENABLE DEVICES

(75) Inventors: Bjorn Markus Jakobsson, Hoboken, NJ (US); Susanne Gudrun Wetzel, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 720 days.

(21) Appl. No.: 09/851,233

(22) Filed: May 8, 2001

(65) Prior Publication Data

US 2002/0044661 A1 Apr. 18, 2002

Related U.S. Application Data

(60) Provisional application No. 60/234,426, filed on Sep. 21, 2000, and provisional application No. 60/229,130, filed on Aug. 30, 2000.

(51) Int. Cl.[7] ............................ H04L 9/00; H04B 1/713
(52) U.S. Cl. ..................................... 713/201; 375/133
(58) Field of Search ................................ 713/200–202, 713/163; 370/343, 345, 281, 344, 295; 375/132, 133

(56) References Cited

U.S. PATENT DOCUMENTS 4,533,948 A * 8/1985 McNamara et al. ........ 380/211
5,768,381 A * 6/1998 Hawthorne ................. 380/284
6,366,622 B1 * 4/2002 Brown et al. ............... 375/322
6,574,266 B1 * 6/2003 Haartsen .................... 375/133
6,650,630 B1 * 11/2003 Haartsen .................... 370/345
6,684,331 B1 * 1/2004 Srivastava .................. 713/163

* cited by examiner

Primary Examiner—Matthew Smithers
(74) Attorney, Agent, or Firm—Stephen M. Gurey

(57) ABSTRACT

Master and slave Bluetooth-enabled devices communicate with other by sending messages using a carrier frequency that is constantly hopping from one frequency to another. In the prior art, each frequency in the sequence of frequencies, known as a hopping sequence, is determined as a known function of the master's Bluetooth address (BD_ADDR) and a universal time parameter. A computer-strong eavesdropper who is listening to one or more frequency bands over a period of time and within range of a user's piconet could determine the BD_ADDR of the user's device by comparing a detected hopping sequence with the hopping sequence associated with each possible BD_ADDR. Once the BD_ADDR of a user's device is determined, the user's location can thereafter be tracked as he moves from location to location using that device. To prevent this, the hopping sequence is determined as a known function of the master's BD_ADDR, a universal time parameter and a seed, which is a random or pseudo-random number communicated between the master and the slave and which is changed each time a new session begins on one of the user's devices operating on the piconet. The eavesdropper is then impeded from associating a detected pattern of channel usage with a particular master's BD_ADDR and its user.

36 Claims, 5 Drawing Sheets

METHOD AND APPARATUS FOR ENSURING SECURITY OF USERS OF SHORT RANGE WIRELESS ENABLE DEVICES

CROSS-REFERENCE

This application claims the benefit of U.S. Provisional Application No. 60/234,426, filed Sep. 21, 2000. This application further claims the benefit of U.S. Provisional Application No. 60/229,130, filed Aug. 30, 2000. This application also describes and claims subject matter that is described in our co-pending United States patent application filed simultaneously herewith also entitled: "METHOD AND APPARATUS FOR ENSURING SECURITY OF USERS OF BLUETOOTH-ENABLED DEVICES", Ser. No. 09/851,098, now U.S. Pat. 6,574,455.

TECHNICAL FIELD

This invention relates to wireless communication on a small local area network (LAN), and more particularly, to local wireless communication between devices operating in accordance with the Bluetooth™ standard.

BACKGROUND OF THE INVENTION

Bluetooth is a recently proposed standard for local wireless communication of mobile or potentially mobile devices, such as cellular phones, wireless headsets, computers, printers, cars, and turn-stiles, allowing such devices in the proximity of each other to communicate with each other (see, e.g., http://www.bluetooth.com; "Specification of the Bluetooth System", Core, Specification Volume 1, v.1.1, Feb. 22, 2001; and "Specification of the Bluetooth System", Profiles, Specification Volume 2, v.1.1, Feb. 22, 2001. The standard promises a variety of improvements over current functionality, such as hands-free communication and effortless synchronization. It therefore allows for new types of designs, such as phones connected to wireless headsets; phones connected to the emergency system of cars; computers connected to printers without costly and unsightly cords; and phones connected to digital wallets, turn-stiles and merchant establishments.

On a small wireless LAN, known as a piconet, all Bluetooth-enabled devices within a set of such devices communicate with a master device within the set, which is selected as the master when the piconet is established. The master device controls the other slave devices within the set, determining which device transmits and which device receives at any given instant. The slave devices on each wireless LAN need to be within approximately 30 feet of the master device for communication to proceed. Since a Bluetooth-enabled device might be within the range of more than one piconet, protection is incorporated to enable a receiving device to discriminate between messages it should properly act on from another device within its own piconet, and messages it should ignore from a device on another piconet that is outside the set. In order to prevent such interference, the prior art Bluetooth standard requires that each message sent by a device include a network descriptor. All messages between the master device and any of the slave devices on the same piconet then contain that same descriptor so when any device on another piconet "hears" a message with a different network descriptor, it knows to ignore it. The network descriptor used on each piconet is a channel access code (CAC) that is determined as a function of a device identifier, a so-called 48-bit Bluetooth Address (BD_ADDR), that is associated with the master in the LAN, each Bluetooth device having a unique BD_ADDR stored in its memory. Thus, when a device is designated as a master upon formation of a piconet, a CAC is computed as a deterministic function of its BD_ADDR, which CAC is then used as the network descriptor for all messages sent over the piconet between the master and any slave devices within the defines set. The slaves, upon learning the BD_ADDR of the master, are able to compute that same CAC using the known deterministic function, thereby knowing which messages to listen for and what network descriptor to use in communicating messages back to the slave.

The problem with this arrangement is that the privacy of an individual using a Bluetooth device can be attacked. For example, if a user having a master Bluetooth-enabled cellular phone, a slave Bluetooth-enabled wireless headphone, and a slave Bluetooth-enabled CD player were to enter an area in which an intentional eavesdropper equipped with a receiver was located, that individual could learn the network descriptor associated with that user's cellular phone by detecting and "examining" the network descriptor used in the messages to and from that master. That eavesdropper could thereafter track the physical location of that user by "listening" in various locations for messages containing that same network descriptor. Thus, for example, if the network descriptor associated with a political figure's cell phone is determined, a visit by that person to what might be a politically embarrassing location could be tracked by eavesdropping receivers at that location. Further, if the network descriptors associated with the Bluetooth devices of multiple individuals were determined, subsequent meetings of those individuals could be tracked by the coincidence of location and time of multiple messages containing network descriptors associated with these individuals. In addition to these privacy issues, various security issues are present once a user's network descriptor is compromised. Specifically, once the network descriptor is determined, the intentional eavesdropper could inject messages into the piconet in a manner that receiving devices within the piconet would assume to be originating from within the piconet from a valid device. This is referred to as an authentication problem since the authenticity of the messages cannot be guaranteed.

A solution to these security problems is the subject of the invention in our afore-noted co-pending patent application. That invention substantially impedes an eavesdropper from tracking the user of a Bluetooth-enabled device who detects and then listens for a network descriptor in the messages being sent to and from the device.

A user of such a Bluetooth-enabled device may still, however, be subject to attack by a computer-powerful eavesdropper who is able to track the user by detecting the channel hopping sequence used by the device. In accordance with the Bluetooth standards, message packets that are sent between two devices are not transmitted within a same single frequency band. Rather, within a message timeslot the message is transmitted in one-of-N bands, where N, in the United States, is equal to 79. At the beginning of a next message timeslot the carrier frequency "hops" to a different frequency. The sequence of frequencies used, known as a channel hopping sequence, is a pseudo-random pattern that is computed as a known function of a universal time parameter and the BD_ADDR of the master device operating on the piconet. This enables the master and slave devices that are communicating with each to know on which frequency band to transmit and receive at any given time. Since, as previously noted, BD_ADDR is a 48-bit word, there are $2^{48}$ different BD_ADDRs, which each produce an associated hopping sequence. Since the function that is used to compute the hopping sequence needs to be known, a strong attacker, i.e., one with significant computational power, could determine the hopping sequence associated with each possible BD_ADDR. Thus, for each BD_ADDR, such a computer-strong eavesdropper would be able to determine in which frequency bands in successive timeslots signal energy would be expected to be present if the device is communicating. The eavesdropper could then listen for the presence of signal energy in plural message timeslots in one or more frequency bands. By comparing the resulting frequency band/message timeslot pattern to the set of hopping patterns associated with each possible BD_ADDR, different BD_ADDRs could be successively excluded as possibilities until only a single BD_ADDR remains that could have generated the detected pattern. Once the computer-strong eavesdropper has so identified the BD_ADDR of the user's Bluetooth-enabled device, that user can thereafter be tracked by listening for that hopping pattern in one or more frequency bands over plural timeslots as that device is used and moved by the user from location to location. Specifically, the eavesdropper only needs to determine whether the hopping sequence being used by a Bluetooth-enabled device that is proximate to and being received by one of his own eavesdropping receivers is the hopping sequence associated with the BD_ADDR of the device being tracked. If the hopping sequence is recognized, then the eavesdropper knows that the device and its user are within the locus of that receiver. Further, once the eavesdropper determines the master's BD_ADDR, the eavesdropper could inject messages into the piconet on which the master is transmitting in the manner described above.

A more secure method of communication that eliminates the above-described problems is thus needed.

SUMMARY OF THE INVENTION

In accordance with the present invention, the hopping sequence used to select the successive frequencies on which multiple devices within a defined set of devices communicate with each other is randomized in a manner that impedes even a computer-strong eavesdropper from associating a detected pattern of frequency hopping with a particular identifier that is associated with one of the devices within the set.

In an embodiment of the invention, the hopping sequence is determined as a known function of a global time parameter, an identifier associated with one of the devices, such as the BD_ADDR of the master on a piconet, and a random number, a so-called seed, such as at least one random number that is known and/or provided to the communicating devices. In a preferred embodiment, that random number is periodically changed each time a new session begins, where a session is defined to be the duration of one event such as one phone conversation, listening to one CD, or printing one job on a printer. In this embodiment, when a session starts and communication between a master and slave begins, the master and/or the slave selects a random number, the seed, which communicated to the devices associated with the session. The master and the slave then compute a hopping sequence as known function of the global time parameter, the master's BD_ADDR, and the random number. The master and slave then use that resultant hopping sequence to determine each next frequency band for transmitting and receiving the successive message packets throughout the duration of the session. When a new session begins, a new random number is generated and communicated to the master and slave, which random number is then used by both the master and the slave to compute a new hopping sequence for the new session. An intentional eavesdropper attempting to determine the hopping sequence being used by a proximate device by listening to the frequency bands in which signal energy is present will be unable to correlate the detected two partial or full hopping sequences to each other or to a specific BD_ADDR. Further, the eavesdropper will be unable to determine where the first hopping sequence is transformed into the second hopping sequence, and that both hopping sequences are in fact generated from the same BD_ADDR. For further security, the seed used in calculating the hopping sequence for the new session may be a function of the random number generated for the new session and one or more random numbers generated for previous sessions. The random number sent from the master to the other devices at the beginning of each session can be encrypted, requiring pre-establishing a key in each device, but precluding the eavesdropper from learning that random number if he overhears it. Alternatively, the random number can be sent in the clear. If sent in the clear, an attacker needs to be present at the exact time of setup to learn that number. Further, when plural random numbers are used together to form the seed, the attacking eavesdropper needs to be present at the exact setup times of all previous sessions. By sending an encrypted random number, device-to-device access can be made inclusive or exclusive to other devices and users of such devices operating on the same first piconet or other devices operating on a second piconet that is physically proximate to and within the range of the first piconet.

DETAILED DESCRIPTION

Figure 1:
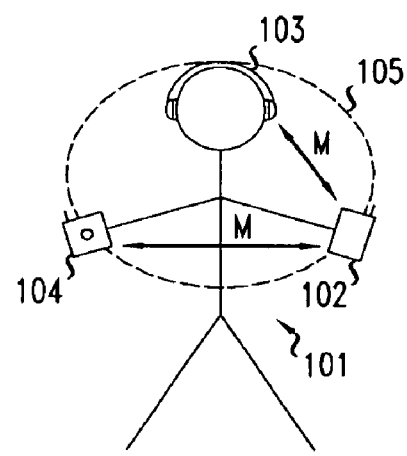
FIG. 1 is a diagram showing a user carrying three Bluetooth-enabled devices on his person that communicate with each other on a piconet.

FIG. 1 shows a user 101 having three active Bluetooth-enabled devices: a cell phone 102, a wireless headset 103, and a CD player 104. When a piconet is established on which these three devices within this defined set communicate, the cell phone 102 is established as the master device, with the wireless headset 103 and CD player 104 being slave devices. The cell phone 102 acts as an intermediary and controller, and all messages from the slaves 103 and 104 are sent to the master cell phone 102 before being passed to the other. Thus, for example, the digitized audio output of the CD player 104 is sent as messages to the master cell phone 102 before being forwarded by the cell phone to the wireless headset 103 for the user's enjoyment. As a controller, the master cell phone can be programmed to switch off the CD player 104 when an incoming phone call arrives and then pass the call to the wireless headset 103 for reception by the user. Generally, the range of Bluetooth-enabled devices is approximately 30 feet. Thus, should the user place the CD player 104 on a table, he needs to remain within 30 feet to maintain reception, assuming the cell phone 102 remains on his person.

Figure 2:
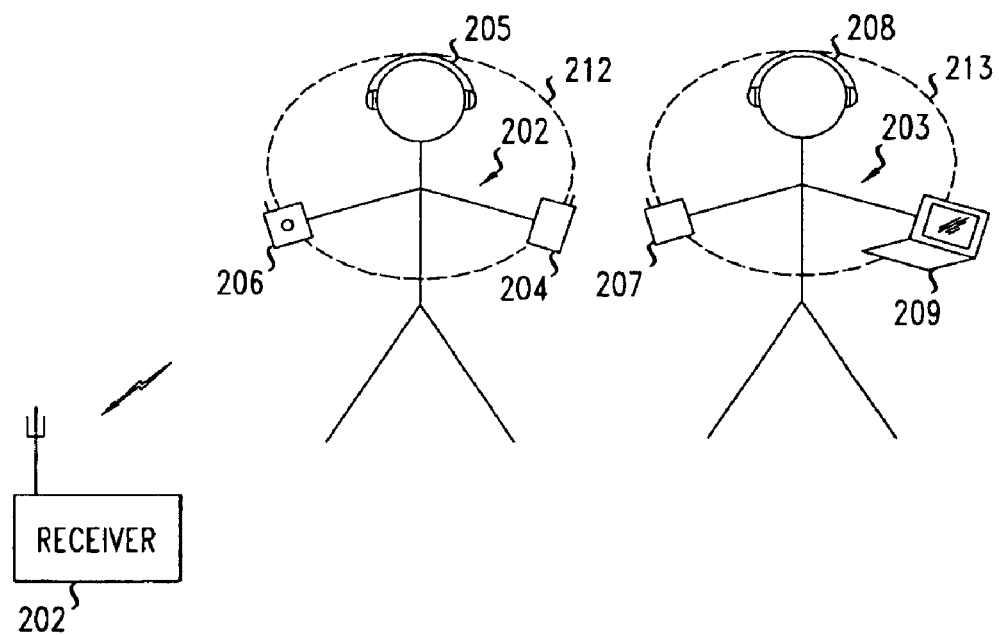
FIG. 2 shows two users whose Bluetooth-enabled devices are within the range of more than one piconet.

A Bluetooth-enabled device can physically be within the range of more than one piconet, such as is shown in FIG. 2, where the devices being used by users 202 and 203 fall within each other's ranges. Thus, the Bluetooth-enabled cell phone 204, headset 205, and CD player 206 of user 202 on-piconet 212 are within range of the cell phone 207, headset 208, and laptop computer 209 of user 203 on piconet 213. As previously noted, in order to prevent one of the devices on piconet 212 from interfering with any of the devices on piconet 213, or vice versa, the Bluetooth standard requires each message to include a network descriptor that is used in all messages on a particular piconet. Thus, messages sent to and from the master cell phone 204 in one defined set on the piconet 212 will be ignored by the devices 207, 208 and 208 in a second defined set since the network description in each of those messages on piconet 213 is different than the network descriptor in each of messages on piconet 213.

Figure 3:
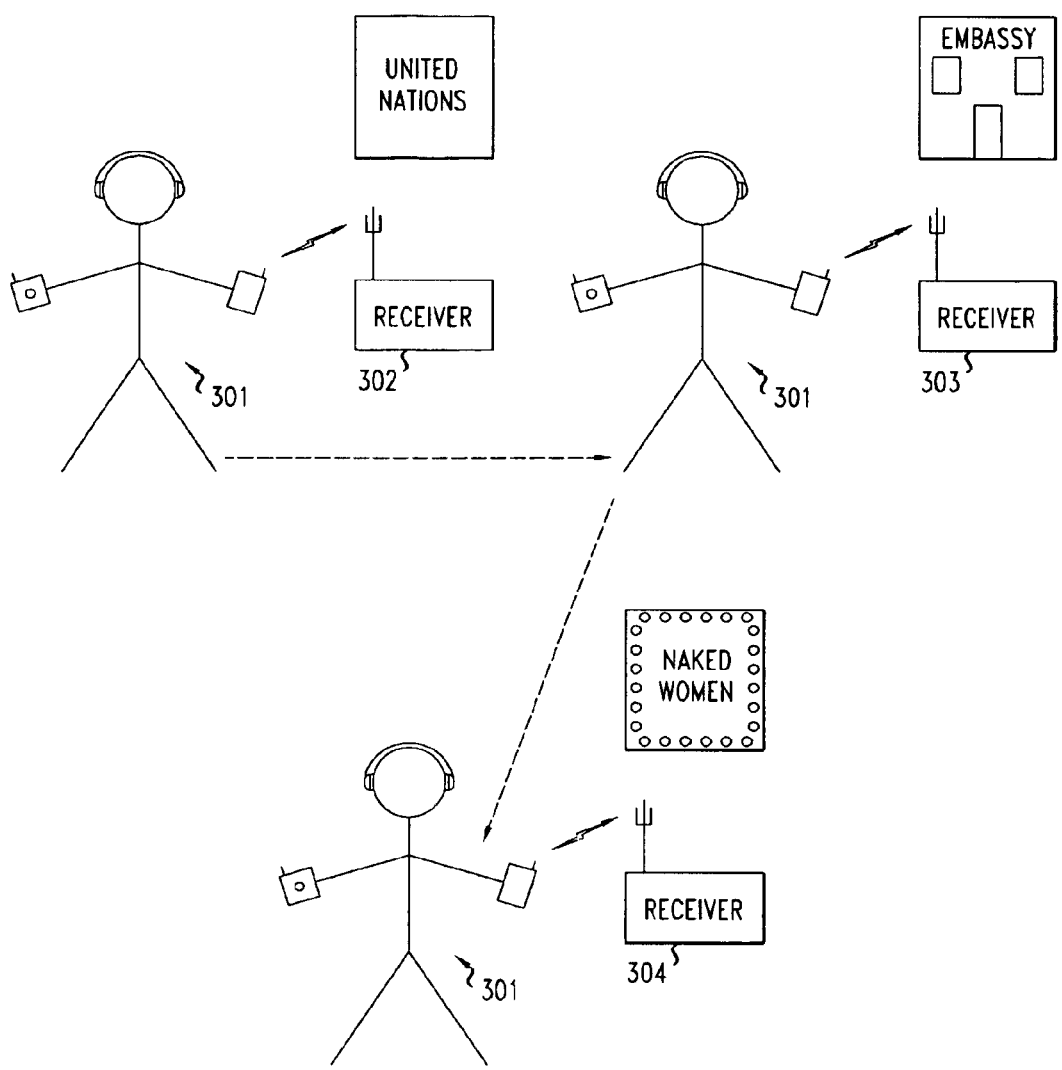
FIG. 3 illustrates a nefarious eavesdropper tracking the location of the user of a Bluetooth-enabled device.

The afore-noted co-pending patent application describes an invention which substantially prevents an intentional eavesdropper who is "listening" though a receiver device 210 outside the defined set but within the range of user 202 from determining the network descriptor used by that users devices. Thus, the ability to track the location of the user by monitoring for the presence of that network descriptor in transmitted messages is impeded. As previously described, however, a computer-strong eavesdropper could still track the location of the user by determining the BD_ADDR of one of the user's Bluetooth-enabled devices by monitoring one or more of frequency bands over a plurality of message timeslots. As described above, the channel hopping sequence used by a Bluetooth-enabled device is computed as a known function of the BD_ADDR of one of the devices in the set of devices on the piconet. The computer-strong eavesdropper can thus determine the hopping sequence for each possible BD_ADDR. A receiver, within range of the Bluetooth-enabled device being used by the user whom the attacking eavesdropper wants to track, can be used to monitor the pattern of signal energy in one or more frequency bands over a plurality of message timeslots. The one channel hopping sequence that could produce such a pattern can be found and the associated BD_ADDR that generates that hopping sequence can then be determined. Once that BD_ADDR is determined, the user's location can be tracked as he passes within the range of other receivers, which are monitoring for a signal energy distribution that matches the hopping sequence associated with that BD_ADDR. As shown in FIG. 3, therefore, as the user 301 moves throughout the city, he could be tracked by receivers 302, 303 and 304, for example, which are each "listening" for that same determined hopping sequence thereby putting his privacy at risk. Furthermore, once a user's BD_ADDR is determined, an intentional eavesdropper who is within range of the piconet could inject messages into the piconet in such a manner that the other devices on the piconet would believe them to be authentic. Thus, the other devices on the piconet would receive and could act upon forged information.

In order to prevent the afore-described problems associated with the prior art, the present invention modifies the hopping sequence used by Bluetooth-enabled devices communicating over a piconet including a randomizing seed into the parameters of the function that determines the hopping sequence from the universal time parameter and the BD_ADDR of one of the devices. By introducing a degree of randomization into that function, an eavesdropper who is able to detect the hopping sequence being used by the communicating devices by listening to one or more frequency channels over a plurality of message timeslots will be unable to associate the detected hopping sequence with a specific BD_ADDR in the manner previously described. In a preferred embodiment, the hopping sequence is determined as predetermined function of the universal time parameter, the BD_ADDR of one of the devices, such as the master, and a random number, which is changed each time a new session begins on the piconet. A session is defined by the duration of one event such as, in FIG. 1, a phone conversation by the user over the cell phone 102 or the playing of a single CD on the CD player 104. Thus, for the Bluetooth-enabled devices in FIG. 1, a new session begins upon the start on a new phone conversation or the playing of a new CD. At the beginning of a new session, in accordance with this embodiment of the invention, the master sends to the slave a random number, the seed, with the BD_ADDR of the master, that are used by both the master and the slave together with a universal time parameter to compute the hopping sequence that will be used by the master and the slave for the duration of that session. In a preferred embodiment, the function used the compute hopping sequence from the BD_ADDR of the master, the seed and the universal time parameter is a so-called one-way function such as the well-known SHA1, or MD5 functions. Such one-way functions prevent the reverse engineering of the inputs to the function given the output of the function, as is well understood by those skilled in the art.

Although the random number used as the seed to compute the hopping sequence is changed on a periodic basis, such as each time a new session begins, in alternative embodiments the random number could remain static. Disadvantageously, the intentional eavesdropper could potentially associate the observed hopping sequence with a previously detected hopping sequence but would not know with whom to associate it. Thus, he would be able to conclude that the same group of devices generated the two hopping sequences, but would they would be unidentifiable.

The random number used as the seed needs to be provided to the master and the slave, which are communicating with each other, to enable each to separately and consistently compute the hopping sequence. This can be achieved through communication between the two, such as sending the random number from one to the other, for example, from the master to the slave, or by sending a first portion from the master to the slave and the remaining second portion from the slave to the master.

The random number, or the portion of the random number, can be sent in the clear, the simplicity of this arrangement being its advantage. Disadvantageously, the random number has the potential to being overheard by the eavesdropper when it is communicated between devices. To prevent such an occurrence, the random number, or the portions of the random number communicated from one device to another can be encrypted, which requires both such devices to pre-establish a key. In addition to the advantage of preventing an eavesdropper from decrypting an overheard random number, encrypting the random number has the advantage of excluding certain users and/or devices from receiving messages that are being transmitted between other devices on the piconet.

Further security with respect to the random number send in the clear in whole or in part between devices for each new session can be achieved by using that random number in combination with at least one previous random number to generate the seed that is used to compute the hopping sequence used in the new session. Thus, in order for the eavesdropper to determine the seed he would have had to be present at the beginning of the new session as well as at the beginning of previous sessions.

Figure 4:
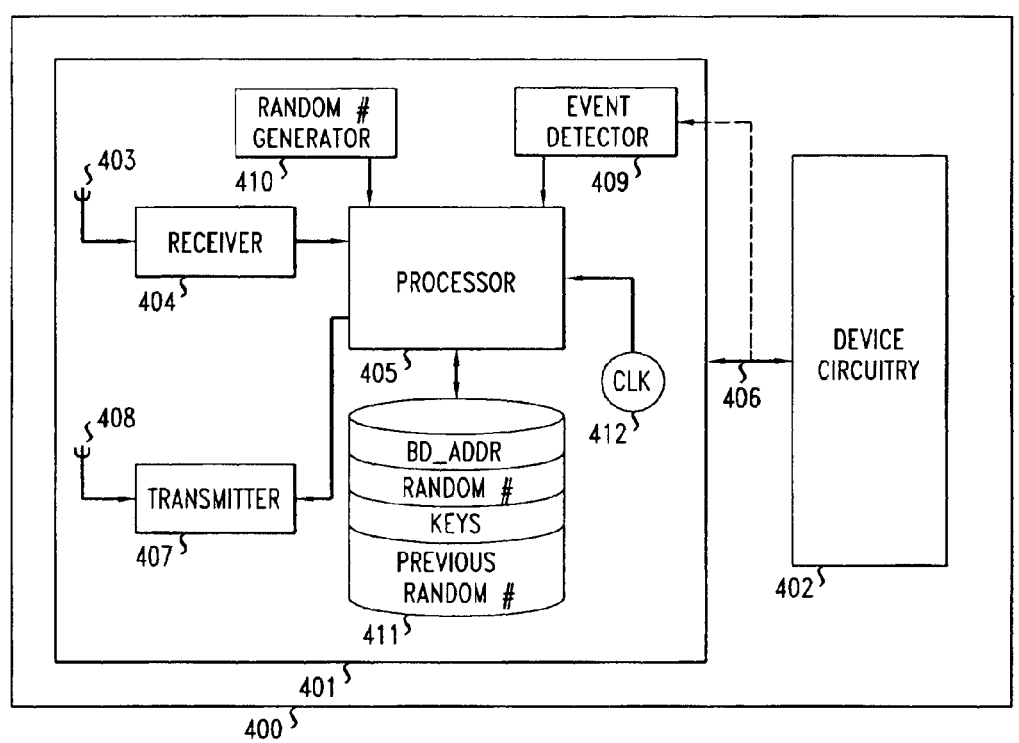
FIG. 4 is a block diagram of a Bluetooth-enabled device in accordance with the present invention.

FIG. 4 is a block diagram that functionally shows a Bluetooth-enabled device 400 in accordance with the invention. As shown, device 400 functionally separates the Bluetooth-functioning elements 401 that cause the device to operate in accordance with the Bluetooth specifications, and the other device circuitry 402 that performs the functions associated with the particular type of unit that the entire device 400 is, such as in the example of FIG. 1, a cell phone, a wireless headset, or a CD player. The Bluetooth-functioning elements 401 include a receiving antenna 403, which receives wireless-transmitted messages from the other devices on the piconet, and passes them on to a receiver 404. Receiver 404 outputs the demodulated messages and inputs them to a processor 405. In addition to performing the functions necessary to implement the present invention, i.e., to periodically compute hopping sequence as a function of the seed, the BD_ADDR of the master, and a universal time parameter determined from the output of a clock 412 that is synchronized with similar clock in other devices on the piconet, processor 405 performs other required Bluetooth operations including those required for the invention described in the afore-noted co-pending patent application, plus other operations which are not discussed further since they are not necessary for an understanding of the present invention. The information within each received message is passed to the device circuitry 402 for device-specific processing over a link 406, which may be a serial or parallel bus or other cabled arrangement, or a wireless connection. Outgoing messages, originating either within the device circuitry 402 or within processor 405, are passed to a transmitter 407 for modulation and output onto output antenna 408. A common antenna may share the functions of the two separate antennas 403 and 408 shown in FIG. 4.

In order to perform the functions of the present invention, the Bluetooth-functioning elements 401 are shown including an event detector 409, which may be a separate element as shown, or incorporated as part of processor 405. If device 400 is the master on the piconet and a new session begins within the device circuitry 402 of that device, event detector 409 is triggered, thereby signaling processor 405 to compute a new hopping sequence. If a new session begins within the device circuitry of a slave, that information is communicated to the master and event detector 409. Upon being triggered by event detector 409, processor 405 retrieves a random number from random number generator 410 to act as the seed in computing the hopping sequence as a predetermined function of the retrieved random number, this device's, the master's, BD_ADDR, and the current universal time parameter from clock 412. Although shown as a separate element, the random number generator 410 could be incorporated within processor 405 and could generate the random number from various sources of randomness such as radio activity or using cryptographic techniques such as one-way functions. For purposes of simplicity, it will be assumed that the entire random number, rather than a portion, is produced by random number generator 410 within the master rather than a portion, which would be combined by another portion generated within a slave. As shown in FIG. 4, the BD_ADDR is stored in a memory 411 associated with processor 405 but may actually be hard-wired as part of the Bluetooth-functioning elements 401. As previously noted, the predetermined function used to compute the hopping sequence is preferably a one-way function. The random number used to compute the hopping sequence, which is also stored in memory 411, is also communicated to the slave where it is used, together with the master's BD_ADDR and the universal time parameter, to compute the hopping sequence using the same function. Thus, if device 400 is not the master but a slave on the piconet, memory 411 stores the BD_ADDR of the master and the current random number used to compute hopping sequence.

For purposes of simplicity, it will be assumed that the master communicates the random number to the slave in the clear. If it is encrypted, then a transmit key is retrieved from memory 411 and processor 405 encrypts the random number before it is transmitted to the slave. A slave, when receiving the random number retrieves a receive key from memory 411 and processor 405 decrypts the received encrypted number using that key.

When a new session is detected, the random number in memory 411 is replaced by a random number generated by random number generator 410 in the master and a new hopping sequence is computed by processor 405 to determine the sequence of frequency bands on which to successively transmit and receive all message packets until event detector 409 detects the beginning of a next session.

As previously described, the embodiments described above can be modified to add even further protection to prevent the intentional eavesdropper from tracking the location of the user of a Bluetooth-enabled device. Specifically, in the purely session-driven embodiment described above, rather than using the random number outputted by random number generator 410 as a seed in computing CAC as a function of that random number and the master's BD_ADDR, the random number outputted by random number generator 410 is combined with at least one previous random number. The combination of these random numbers is then used as the seed in computing CAC as a function of that combination and the master's BD_ADDR. Thus, in this embodiment, if the attacker is present when a session is set up and learns of the random number being passed from the master to the slave(s), he will not be able to compute CAC without also having been present when each previous session was set up when the previous random numbers were passed. Thus, in this embodiment, memory 411, within the Bluetooth elements 401, also includes at least one storage location for storing the at least one previous random number outputted by random number generator 410.

The second embodiment of the invention in which the CAC is re-computed not only at the beginning of each session, but periodically within each session, can also be similarly modified. Thus, the random number used as the seed to compute the CAC at the beginning of each session or within each session at the end of each periodic interval is a combination of a random number outputted by random number generator 210 at that time and at least one previous random number that is stored in memory 311.

If the seed used to compute hopping sequence is a combination

Figure 5:
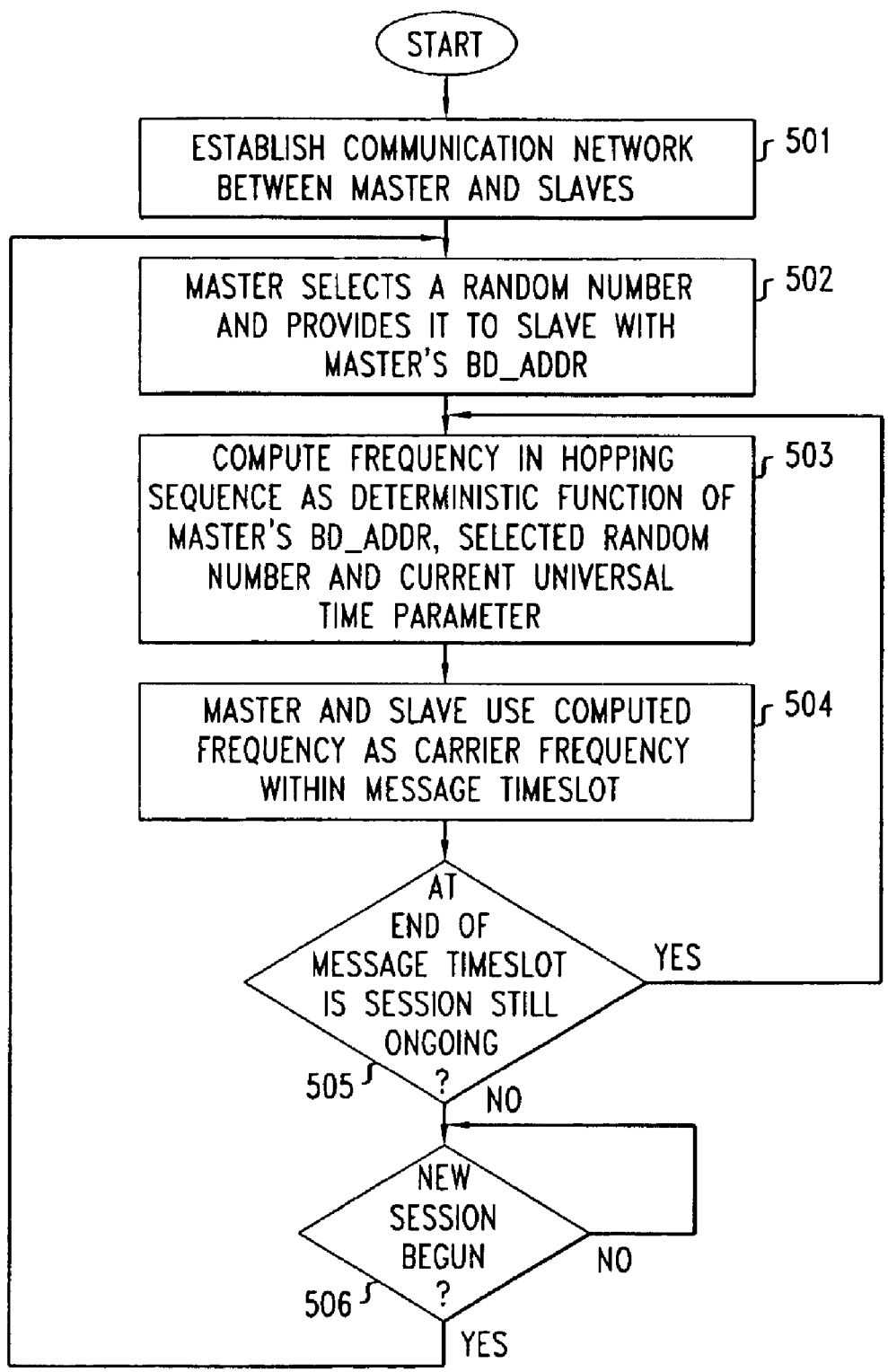
FIG. 5 is a flow chart detailing the steps of a first embodiment of the present invention.

FIG. 5 is a flowchart that illustrates the steps of this first embodiment of the invention. At step 501, a communication network is established between the designated master and the slave(s). At step 502, the master selects a random number to be used as the seed which is provided to the slave(s) together with the master's BD_ADDR. At step 503, the CAC is computed by the master and the slave(s) as a deterministic function of the master's BD_ADDR and the selected random number. At step 504, that computed CAC is used as the network descriptor in all messages transmitted between the master and the slave(s). At step 505, a determination is made whether the current session is still ongoing. If yes, at step 504 again, the same computed CAC continues to be used as the network descriptor in all messages between the master and the slave(s). If, at step 505, the determination is made that the current session in not still ongoing, then, at step 506, a determination is made whether a new session has begun. If yes, the flow returns to step 502, where the master selects a new random number to used as the seed and which new seed is provided to the slave(s). Again, as previously described, a new CAC is computed by the master and the slave(s), which is used as the network descriptor in all messages between the master and the slave(s) until that session ends.

An intentional eavesdropper will thus first "hear" $CAC_1$ computed for use during the first session in the messages it captures. When that session ends, the eavesdropper will no longer hear $CAC_1$ in any message. When a new session begins, the eavesdropper will "hear" $CAC_2$, computed for use during the second session, in the messages it overhears. The eavesdropper can't, however, determine that both $CAC_1$ and $CAC_2$ have been generated from the same BD_ADDR, and therefore is precluded from tracking the locations of the individual using the Bluetooth-enabled device as that Bluetooth user moves from location-to-location.

If a session lasts a long period of time, such as during a long telephone call, the CAC remains invariant in the first embodiment described above. The inentional eavesdropper, by listening for the CAC being used, would then be able to track the user throughout the duration of that session. In order to prevent a potential a breech of privacy in such a situation, a second embodiment of the present invention provides a finer-grained solution to the problem. In accordance with the second embodiment of the invention, when a session begins, the master sends to the slave(s), together with its BD_ADDR, a seed that consists of a randomly generated number plus a time parameter associated with the master's internal clock. The CAC is then computed by the master and the slave(s) as a predetermined function of the BD_ADDR, the random number and the time parameter. Thereafter, throughout the same session, the CAC is automatically recomputed at the end of every interval of predetermined duration using the then current time parameter associated with the master's clock. The CAC is thus changed at a much faster rate than in the purely session-driven embodiment described above. The intentional eavesdropper then has much greater difficulty tracking the location of the user of the Bluetooth-enabled device by "listening" for a particular CAC.

In order to implement this second embodiment, the Bluetooth-enabled device 400 in FIG. 4 stores the time parameter associated with the master's clock in memory 411. Processor 405 then thereafter re-computes the CAC based on the master's BD_ADDR, the current session's random number, and that stored master's time parameter as it is modified by the accumulated predetermined time intervals that have passed since the session began, the latter being determined by clock 412. Clock 412 is shown for illustrative purposes as a separate element but in practice could be incorporated into the processor 405. If device 400 is the master, when a session begins the then current value of clock 412 is stored in memory 411 and sent together with the random number outputted by random number generator 410 to the slave(s).

Figure 6:
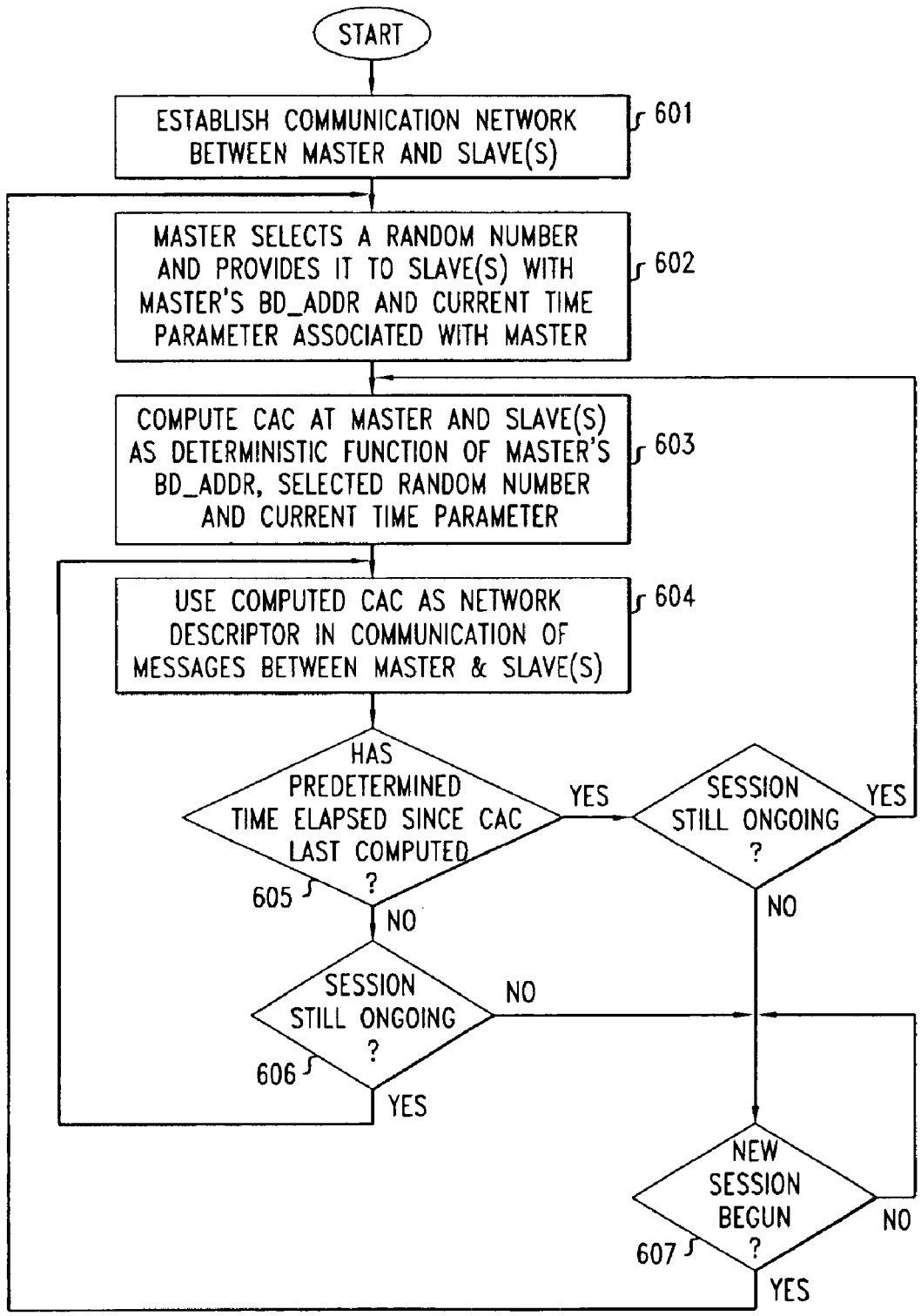
FIG. 6 is a flow chart detailing the steps of a second embodiment of the present invention.

FIG. 6 is a flowchart that illustrates the steps of this second embodiment. At step 601 communication is established between the master and the slave(s). At step 602, a random number is selected by the master and provided to the slave(s) together with the master's BD_ADDR and a current time parameter associated with the master. At step 603, the CAC is computed by both the master and the slave(s) as a deterministic function of the master's BD_ADDR, the selected random number and the current time parameter associated with the master. At step 604, that computed CAC is used as the network descriptor in all the messages between the master and the slave(s). At step 605, a determination is made whether the predetermined time interval has elapsed since the CAC was last computed. If it has not, then at step 606, a determination is made whether the current session is still ongoing. If it is, then the previously computed CAC continues to be used as the network descriptor in each message. If the current session is not ongoing, the flow proceeds to decision step 607 to await the beginning a new session. When a new session begin, the flow returns to step 602 where a new random number and the then current master's time parameter are used as a seed to compute a new CAC as a function of that seed and the master's BD_ADDR. If, at step 605, a determination is made that the predetermined time interval has elapsed and, at step 608, the current session is still ongoing, then the flow returns to step 604 where the CAC is recomputed as the predetermined function of the master's BD_ADDR, the previously determined random number and the then current master's time parameter. If, at step 608, the current session is not still ongoing, then the flow proceeds to step 607 to await the beginning of a new session. Upon the occurrence of a new session, the flow returns to step 602. As previously, at step 602, a new random number is selected by the master and combined with the master's then current time parameter to form a seed that is used together with the master's BD_ADDR to compute the CAC.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, although the present invention has been described above for use by Bluetooth-enabled devices on a wireless network, the present invention could be used on any type of communication network, in which multiple of devices within a defined set, Bluetooth-enabled or not, are communicating with each other. From a practical standpoint, however, the invention is most likely to find use on a wireless network where devices communicate with each other in a master-slave relationship.

It will be further appreciated by those skilled in the art that the block diagrams herein represent conceptual views of illustrative circuitry embodying the principles of the invention. Similarly, it will be appreciated that the flow charts represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method for use by a device operating on a network over which multiple devices belonging to a defined set communicate with each other by transmitting and receiving messages, the method comprising:

transmitting the messages at a frequency that hops from one frequency to another over time in accordance with a predictable pseudo-random hopping sequence that determines each frequency in the hopping sequence from a particular identifier associated with one of the devices and a universal time parameter;

characterized in that:

each frequency in the hopping sequence is determined from a known function of the particular identifier, the universal time parameter, and a seed that is changed over time and that further randomizes the hopping sequence from the predictable pseudo-random hopping sequence that which would otherwise be determined from the particular identifier and the universal time parameter alone, whereby a pattern of changing transmit frequencies that is detected in messages received by a device outside the defined set is impeded from being associated with the particular identifier associated with one of the devices within the set.

2. The method of claim 1 wherein the seed is changed periodically.

3. The method of claim 1 wherein the seed is changed aperiodically.

4. The method of claim 1 wherein the seed is changed when a new session begins on one of the devices in the set.

5. The method of claim 1 wherein the known function is a one-way function.

6. The method of claim 1 wherein the seed is at least a first random or pseudo-random number.

7. The method of claim 4 wherein the seed is at least a first random or pseudo-random number that determines in part the sequence of frequencies in the hopping sequence used for transmitting messages within a current session.

8. The method of claim 6 wherein the seed is a combination of the first random or pseudo-random number and at least a second random or pseudo-random number that determined in part the sequence of frequencies in the hopping sequence used for transmitting messages within at least one previous session.

9. The method of claim 6 wherein the random or pseudo-random number is received in an encrypted form by the device from one of the other devices in the set, and the encrypted random or pseudo-random number is decrypted before being used as the seed.

10. A method for use in a Bluetooth-enabled device operating on a wireless network over which multiple Bluetooth-enabled devices within a defined set communicate with each other by transmitting and receiving messages to and from a master device within the set, the method comprising:

transmitting the messages at a frequency that hops from one frequency to another over time in accordance with a predictable pseudo-random hopping sequence that determines each frequency within the hopping sequence from a Bluetooth address (BD_ADDR) associated with the master device and a universal time parameter;

characterized in that:

each frequency in the hopping sequence is determined from a known function of the master device's BD_ADDR, the universal time parameter, and a seed that is changed over time and that further randomizes the hopping sequence from the predictable pseudo-random hopping sequence that which would otherwise be determined from the master device's BD_ADDR and the universal time parameter alone, whereby a pattern of changing transmit frequencies that is detected in messages received by a device outside the defined set is impeded from being associated with the master device's BD_ADDR.

11. The method of claim 10 wherein the seed is changed periodically.

12. The method of claim 10 wherein the seed is changed aperiodically.

13. The method of claim 10 wherein the seed is changed when a new session begins on one of the devices in the set.

14. The method of claim 10 wherein the known function is a one-way function.

15. The method of claim 10 wherein the seed is at least a first random or pseudo-random number.

16. The method of claim 13 wherein the seed is at least a first random or pseudo-random number that determines in part the sequence of frequencies in the hopping sequence used for transmitting messages within a current session.

17. The method of claim 15 wherein the seed is a combination of the first random or pseudo-random number and at least a second random or pseudo-random number that determined in part the sequence of frequencies in the hopping sequence used for transmitting messages within at least one previous session.

18. The method of claim 15 wherein the random or pseudo-random number is received in an encrypted form by the device from one of the other devices in the set, and the encrypted random or pseudo-random number is decrypted before being used as the seed.

19. Apparatus for use in a device operating on a network over which multiple devices belonging to a defined set communicate with each other by transmitting and receiving messages, the apparatus comprising:

means for transmitting the messages at a frequency that hops from one frequency to another over time in accordance with a predictable pseudo-random hopping sequence; and means for determining each frequency in the hopping sequence from a known function of a particular identifier associated with one of the devices in the set, a universal time parameter, and a seed that is changed over time and that further randomizes the hopping sequence from the predictable pseudo-random hopping sequence that would otherwise be determined from the particular identifier and the universal time parameter alone, whereby a pattern of changing transmit frequencies that is detected in messages received by a device outside the defined set is impeded from being associated with the particular identifier associated with one of the devices within the set.

20. The apparatus of claim 19 wherein the seed is changed periodically.

21. The apparatus of claim 19 wherein the seed is changed aperiodically.

22. The apparatus of claim 19 wherein the seed is changed when a new session begins on one of the devices in the set.

23. The apparatus of claim 19 wherein the known function is a one-way function.

24. The apparatus of claim 19 wherein the seed is at least a first random or pseudo-random number.

25. The apparatus of claim 22 wherein the seed is at least a first random or pseudo-random number that determines in part the sequence of frequencies in the hopping sequence used for transmitting messages within a current session.

26. The apparatus of claim 24 wherein the seed is a combination of the first random or pseudo-random number and at least a second random or pseudo-random number that determined in part the sequence of frequencies in the hopping sequence used for transmitting messages within at least one previous session.

27. The apparatus of claim 24 wherein the random or pseudo-random number is received in an encrypted form by the device from one of the other devices in the set, and the processor decrypts the encrypted random or pseudo-random number.

28. Apparatus for use in a Bluetooth-enabled device operating on a wireless network over which multiple Bluetooth-enabled devices within a defined set communicate with each other by transmitting and receiving messages to and from a master device within the set, the apparatus comprising:

means for transmitting the messages at a frequency that is hops from one frequency to another over time in accordance with a predicable pseudo-random hopping sequence; and means for determining each frequency in the hopping sequence from a known function of a Bluetooth address (BD_ADDR) associated with the master device, a universal time parameter, and a seed that is changed over time and that further randomizes the hopping sequence from the predictable pseudo-random sequence that would otherwise be determined from the master device's BD_ADDR and the universal time parameter alone, whereby a pattern of changing transmit frequencies that is detected in messages received by device outside the defined set is impeded from being associated with the master device's BD_ADDR.

29. The apparatus of claim 28 wherein the seed is changed periodically.

30. The apparatus of claim 28 wherein the seed is changed aperiodically.

31. The apparatus of claim 28 wherein the seed is changed when a new session begins on one of the devices in the set.

32. The apparatus of claim 28 wherein the known function is a one-way function.

33. The apparatus of claim 28 wherein the seed is at least a first random or pseudo-random number.

34. The apparatus of claim 31 wherein the seed is at least a first random or pseudo-random number that determines in part the sequence of frequencies in the hopping sequence used for transmitting messages within in a current session.

35. The apparatus of claim 33 wherein the seed is a combination of the first random or pseudo-random number and at least a second random or pseudo-random number that determined in part the sequence of frequencies in the hopping sequence used for transmitting messages within at least one previous session.

36. The apparatus of claim 33 wherein the random or pseudo-random number is received in an encrypted from by the device from one of the other devices in the set, and the processor decrypts the encrypted random or pseudo-random number.

* * * * *